UNITED STATES PATENT OFFICE.

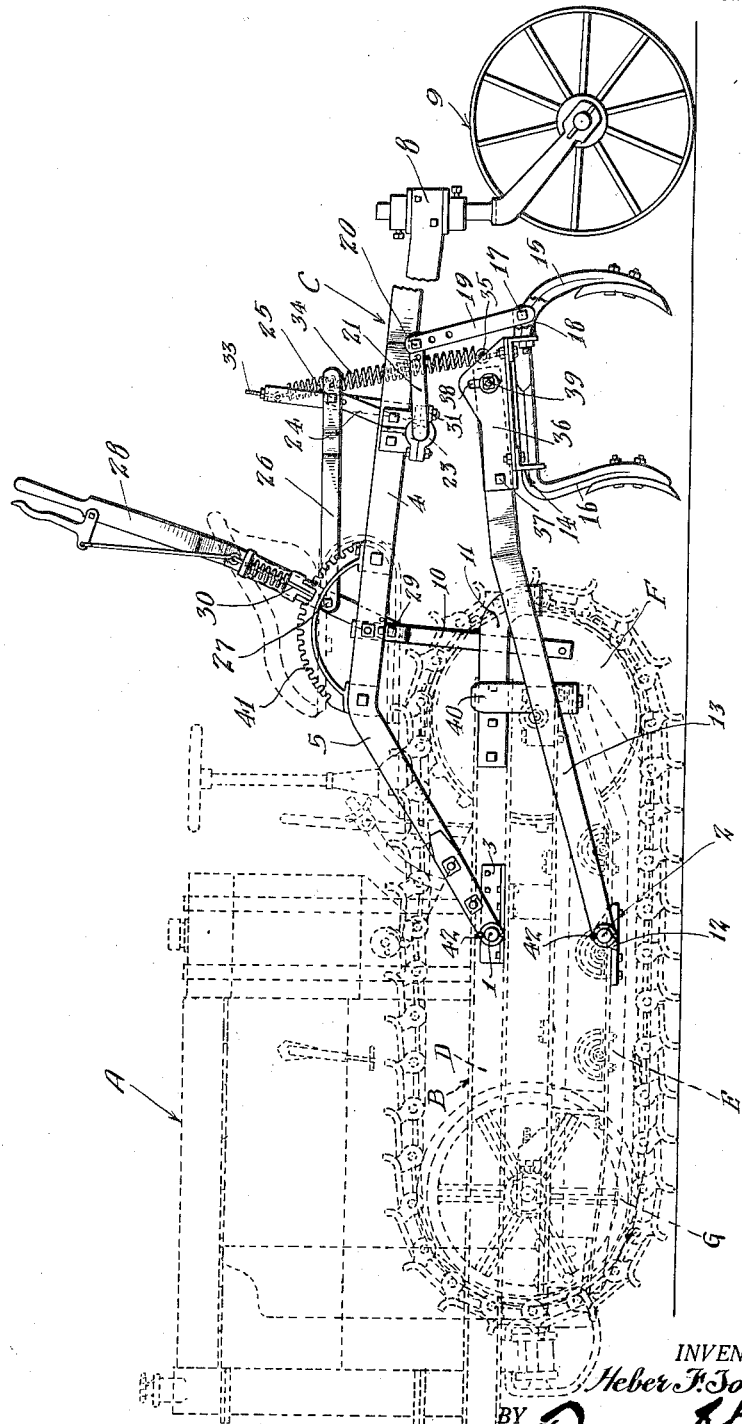

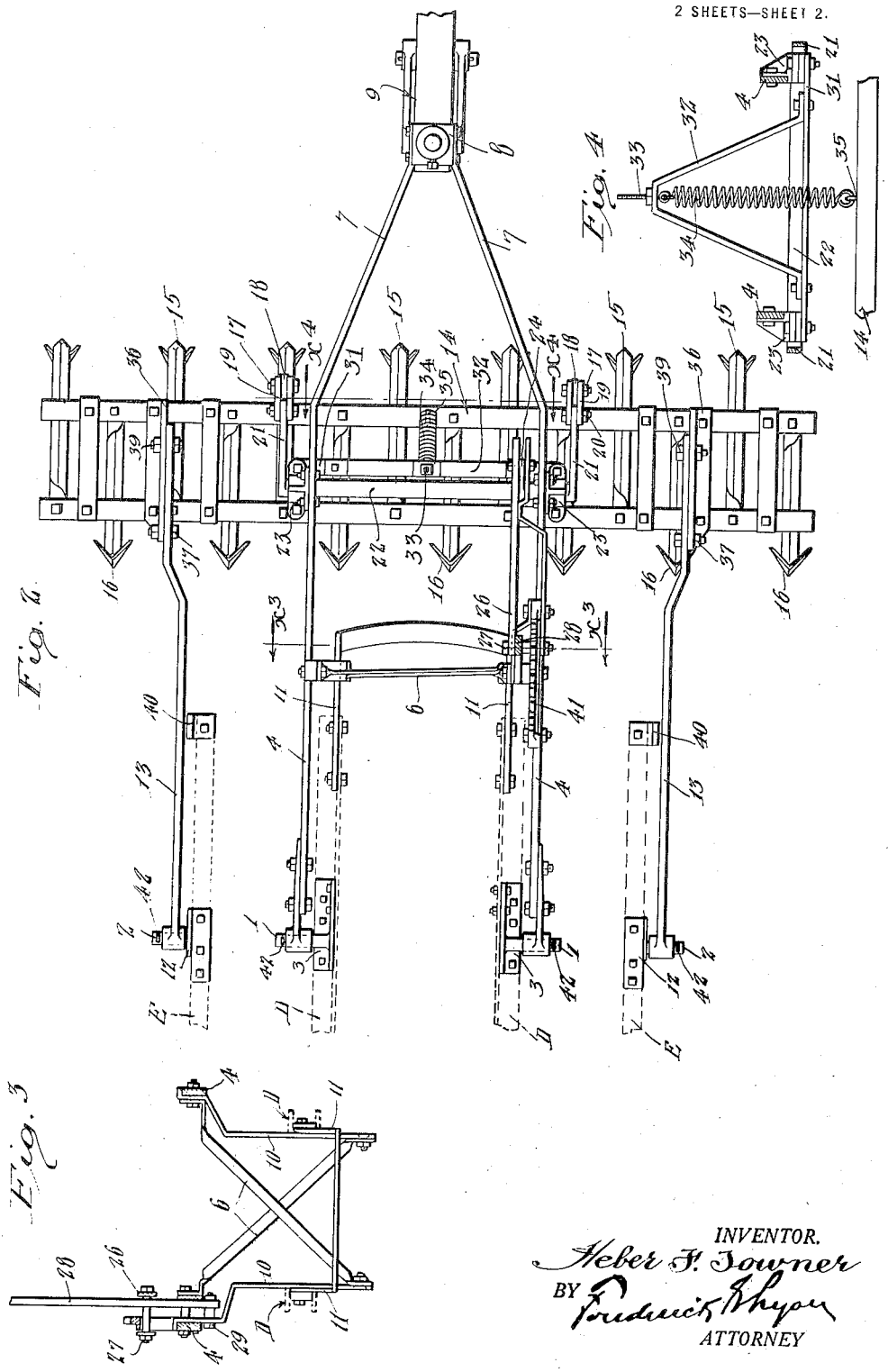

HEBER F. TOWNER, OF SANTA ANA, CALIFORNIA.

DEPTH-REGULATING DRAFT DEVICE FOR GROUND-WORKING TOOLS.

1,397,748.     Specification of Letters Patent.     Patented Nov. 22, 1921.

Application filed April 19, 1921. Serial No. 462,523.

*To all whom it may concern:*

Be it known that I, HEBER F. TOWNER, a citizen of the United States, and a resident of Santa Ana, in the county of Orange and State of California, have invented certain new and useful Improvements in Depth-Regulating Draft Devices for Ground-Working Tools, of which the following is a specification.

This invention relates to devices of the character employed in raising and lowering ground working tools for withdrawing them from the earth and permitting them to lower so as to penetrate the earth to the depth to which it is desired to work the soil. The invention is especially useful for connecting a tractor to the ground working tools.

An object of the invention is to provide a draft device of this character of comparatively simple construction and one that is convenient to operate.

Another object is to construct the draft device in such manner that it may be readily attached to the well-known track-laying or caterpillar-tread type of tractor.

Other objects and advantages will appear hereinafter.

The accompanying drawings illustrate the invention:

Figure 1 is a side elevation of a draft device embodying the invention, a portion of the supporting member being broken away to contract the view. The device is shown equipped with ground working tools and attached to a tractor which is shown in dotted lines. The ground working tools are shown raised above the surface upon which the device operates.

Fig. 2 is a plan view of Fig. 1, omitting all but fragments, of the tractor frame. The caster wheel is partly broken away to contract the view.

Fig. 3 is a sectional elevation on line indicated by $x^3$—$x^3$, Fig. 2.

Fig. 4 is a fragmental elevation from the line indicated by $x^4$—$x^4$, Fig. 2.

A tractor is indicated at A in Fig. 1 of the drawings in dotted lines, said tractor being of a well-known make of the track-laying or caterpillar-tread type. The frame of the tractor is indicated at B and it is to this frame that the improved draft device is connected. The draft device is indicated in general by the character C and it is designed to be pivotally connected to the frame B. For this purpose, upper pivots 1 are mounted on the upper frame members D and lower pivots 2 are fastened to the lower frame members E. The pivots 1, 2 are thus provided on each side of the frame and are positioned in planes lying between the tractor sprockets F, G. The pivots 1 engage bearings 3 in the forward ends of supporting members 4, the forward portions of the members 4 having downwardly and forwardly slanting portions 5. Rearwardly of the portions 5 the members 4 are connected with one another by a brace or braces 6. The rear portions of the members 4 converge as indicated at 7 and are provided with a bearing 8 supported by a caster wheel 9. As the caster wheel 9 runs over an uneven surface, the members 4 swing up and down on the pivots 1. In order to aid in the prevention of side motion of the members 4 relative to the tractor, the members 4 are provided with downwardly extending fingers 10 adapted to have sliding engagement with guides 11 fastened to the rear ends of the upper frame members D. Some tractors are provided with members similar to the guides 11 and such members, therefore, function as the guides. In other cases, it is necessary to provide the tractor with the guides 11.

The lower pivots 2 engage bearings 12 formed in the forward ends of draft arms 13 that project forwardly from a frame 14 from which the ground working tools are suspended. One form of ground working tools is indicated at 15 and another form at 16, but it is to be understood that the types shown are only illustrative and that any other suitable types of ground working tools may be employed, if desired.

When the tractor advances, it is clear that the pull of the tools 15, 16, is transmitted through draft arms 13 to the lowest portion of the tractor frame B and that, because of the connections between the arms 13 and the frame B being at a point substantially midway between the axes of the tractor sprockets F, G, upward and downward movement of the pivots 1 and 2 will be a minimum when the tractor operates over an uneven surface, for it is well known that the rear end of a tractor is liable to be raised higher than its intermediate portion when the tractor is riding over a mound or ridge of earth. Thus, because of this particular way of connecting the ground working tools with the tractor, the angle at which the ground working tools engage the earth will not greatly vary when the tractor is traveling over an uneven surface and drawing the tools through the earth.

The means provided for raising and lowering the frame 14 are constructed as follows: Pivoted at 17 to brackets 18 mounted on the frame 14 are links 19 arranged, in this instance, in pairs. Each pair of links 19 is pivoted at 20 to a crank 21, the cranks 21 being provided at the ends of a shaft 22 journaled in bearings 23 which are supported by the members 4. Projecting from the shaft 22 is an arm 24 which is pivoted at 25 to a link 26 that, in turn, is pivoted at 27 to an operating lever 28. The operating lever 28 is pivotally connected at 29 to one of the fingers 10 and is adjustable along a notched quadrant 41, the lever 28 being provided with the usual detent 30 for selectively engaging the notches of the quadrant for holding the lever in the position to which it is adjusted. When the lever 28 is moved forwardly it raises the frame 14 with respect to the tractor and the caster wheel 9 so as to elevate the ground-working tools.

A cross member 31 connects the bearings 23 with each other and mounted on said cross member is a yoke 32 to which is fastened by an eye bolt 33 the upper end of a spring 34 that is connected at its lower end by an eye bolt 35 to the frame 14. The spring 34 functions to take some of the weight of the frame 14 and ground working tools off of the lever 28 and prevents too rapid descent of the frame 14 when the detent 30 is released.

The bearings 3, 12 are detachably mounted on the pivots 1, 2, cotter pins 42 in the pivots preventing the bearings from becoming detached.

The invention operates as follows: The device will be attached to the tractor in the manner explained above with the lever 28 in position to elevate the ground working tools. The tractor will be driven over the surface to be worked and the operator will push the lever 28 forward to a position that accords with the desired depth of insertion of the ground working tools into the soil. If the soil is very firm, so as to make it difficult to raise the ground working tools, when the operator desires to so raise said tools, he will drive the tractor rearward, thus aiding in pushing the tools upwardly. Because of the pivotal connection between the members 4 and the tractor frame and between the draft arms 13 and the frame, the ground working tools, when being drawn through uneven ground, will swing up and down in an arc whose center is the pivots 2, which are positioned relatively close to the surface of the earth, thus entailing that when the frame 14 is being raised the angle of the tools with respect to the earth is diminished. Because of the relatively low level at which the pivots 2 are located, the pull on the frame 14, when in lowered position, is substantially horizontal so that as the tractor rises and falls upon the uneven surface of the field the tools will not rise and lower correspondingly but will be maintained at a substantially uniform depth.

I have provided for relative adjustment of the frame 14 and draft arms 13, and for this purpose said frame is provided with upstanding flanges 36 which are pivoted at their forward ends at 37 to the arms 13, respectively. The rear ends of the flanges 36 are provided with slots 38 through which pass bolts 39 fixed to the arms 13. By loosening the bolts 39 the frame 14 may be swung up or down relative to the arms 13 to change the angular relation of the ground working tools to the earth.

To prevent side motion of the draft arms 13, and consequently of the frame 14, the lower frame members E of the tractor are provided with upstanding fingers 40 adapted to be engaged by the inner faces of the arms 13.

One of the great advantages of the pivots 2 being positioned below a plane connecting the centers of the wheels of the tractor is that when the pull of the tools comes upon the tractor as the tools are working in the earth said pull will have a tendency to hold down the front end of the tractor, thus maximizing the traction of the tractor tread.

I claim:

1. In a depth-regulating draft device, supporting members adapted at their forward ends for pivoted connection with the frame of a tractor, draft arms adapted at their forward ends for pivotal connection with the tractor frame, a frame connected with said arms, ground-working tools carried by the frame, a caster wheel to support the rear ends of the supporting members, and means adjustably connecting the tool-carrying frame to the supporting members.

2. In a depth-regulating draft device, supporting members adapted at their forward ends for pivotal connection with the frame of a tractor, a caster wheel to support the rear ends of the supporting members, a frame provided with ground working tools, and means adjustably connecting the tool-frame with the supporting members.

3. In a depth-regulating draft device, ground-working tools, arms connected with the tools and adapted for pivotal connection with the frame of a tractor, a caster wheel and means supported in part by the caster wheel to raise and lower the tools.

4. The combination with a track-laying tractor, of pivots carried at the sides of the tractor frame between the tractor sprockets, draft arms engaging said pivots, a frame connected with said arms and adapted to carry ground-working tools, a caster wheel, and means supported in part by the caster wheel to raise and lower the frame.

5. In a depth-regulating draft device, supporting members adapted at their forward ends for pivoted connection with the frame of a tractor. draft arms adapted at their forward ends for pivotal connection with the frame of the tractor, a frame connected with said arms and adapted to carry ground-working tools, a caster wheel supporting the rear ends of the supporting members, a lever pivotally mounted on one of the supporting members, and means operatively connecting the tool-carrying frame with the lever.

Signed at Los Angeles, California, this 12th day of January, 1921.

HEBER F. TOWNER.

Witnesses:
LEONARD S. LYON,
L. BELLE WEAVER.